Figure 1:
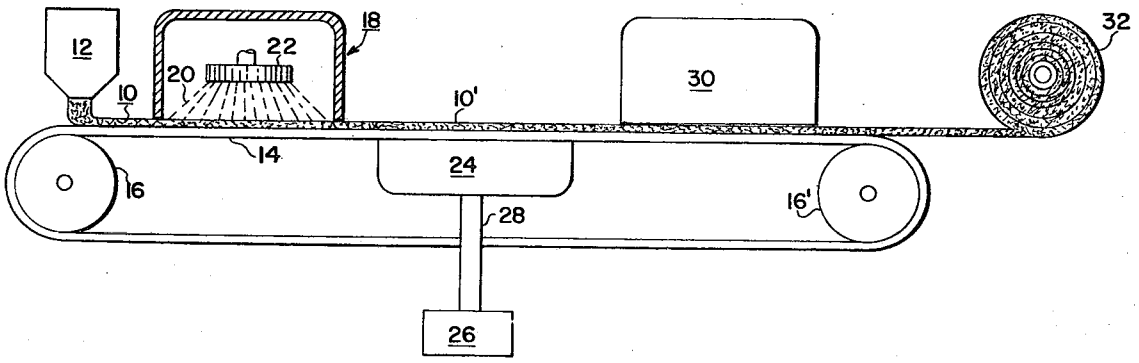
Figure 2:
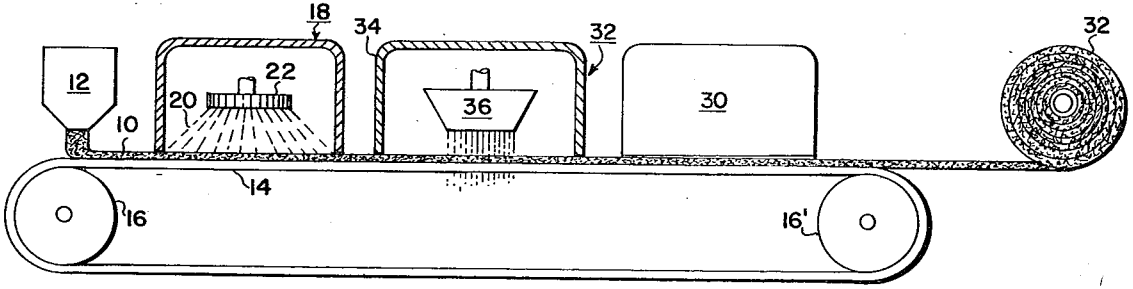

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 13, 1970

870 O.G. 393

T870,008
PROCESS AND APPARATUS FOR PRODUCING BONDED FIBROUS BATTINGS

James R. G. Pearman and Harry W. Bachman, both of P.O. Box 511, Kingsport, Tenn. 37662

Filed Dec. 29, 1967, Ser. No. 694,730
**Int. Cl. B44d *1/02***
U.S. Cl. 117—119
1 Sheet Drawing. 7 Pages Specification

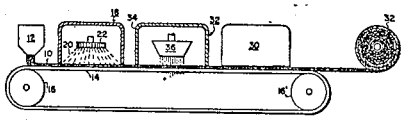

A resinous binder is sprayed onto the upper surface of a relatively dense and thick fibrous batting material. A vapor pressure differential is established between the upper and lower surfaces of the batting after spraying in order to distribute the binder uniformly throughout the batting. The vapor pressure differential is established by applying either suction at the bottom of the batt or forced air to the upper surface of the batt. The batting is then subjected to curing to harden the binder.

Jan. 13, 1970 J. R. G. PEARMAN ETAL T870,008

PROCESS AND APPARATUS FOR PRODUCING BONDED FIBROUS BATTINGS

Filed Dec. 29, 1967

JAMES R.G. PEARMAN
HARRY W. BACHMAN
*INVENTORS*

BY William T. French
Daniel B. Reece III
ATTORNEYS